May 10, 1938. G. S. TREMAINE 2,116,988
FLEXIBLE ENGINE SUPPORT
Filed May 5, 1934
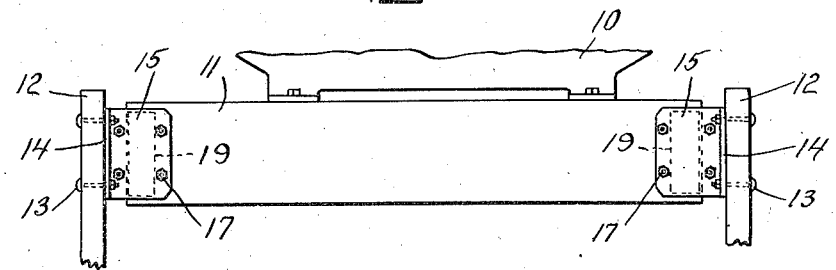
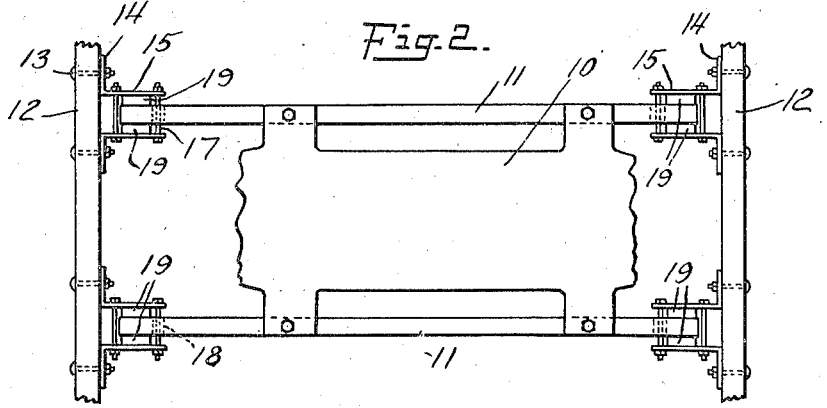
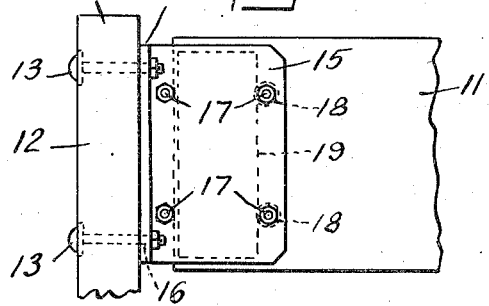
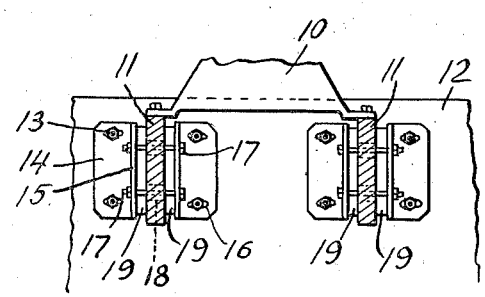
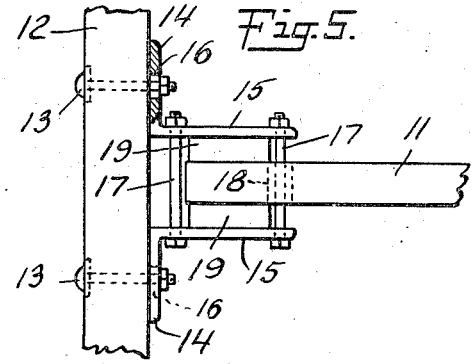
INVENTOR
Glenville S. Tremaine
BY
Pennie Davis, Marvin Edmonds
ATTORNEYS Patented May 10, 1938

2,116,988

UNITED STATES PATENT OFFICE 2,116,988

FLEXIBLE ENGINE SUPPORT

Glenville S. Tremaine, Westfield, N. J., assignor to Electric Boat Company, Bayonne, N. J., a corporation of New Jersey Application May 5, 1934, Serial No. 724,007

4 Claims. (Cl. 248—10)

This invention relates to flexible or resilient supports for vibrating bodies and has particular reference to supports for internal combustion engines which will absorb the vibrations thereof, although the invention is not limited to that use.

In accordance with this invention, a flexible support for engines or other vibrating bodies is provided which is simple and inexpensive in construction, which absorbs shocks and vibrations in all directions, which is adjustable to accommodate various degrees of vibration and conditions of service, and which may be readily adapted to widely different loads and operating conditions of the body whose vibrations are to be absorbed.

The invention comprises blocks of resilient material such as rubber clamped under compression between substantially vertical surfaces of the supporting and supported members without being bonded or otherwise secured thereto, such that the frictional contact between the surfaces of the rubber blocks and the corresponding surfaces of the members is the only supporting connection between them and the load is sustained by the rubber in shear. The degree of compression of the rubber blocks by the members is adjustable to suit the conditions of operation, and the rubber blocks are replaceable by blocks of different sizes, thickness, and resiliency, depending upon requirements.

In adapting the new flexible support of this invention for supporting marine, automobile, aeroplane, and similar engines, the engine is preferably supported on a pair of longitudinal rails or beams, the ends of each of which are interposed between a pair of flat rubber blocks which in turn are clamped between a pair of brackets or the like secured to the hull, chassis, fuselage, or the like. The brackets are drawn together by bolts or the like, to compress to the proper load-supporting degree, the rubber blocks lying between the substantially vertical surfaces of the brackets and the rails, so that the blocks frictionally support the rails and the rubber is placed in shear. The rubber accordingly not only sustains the vertical load and absorbs vibrations in that direction, but also any lateral and longitudinal strains and vibrations set up by propeller thrust, engine torque, vibrations of the supporting member of a different period of vibration than the engine, and the like. Simply by changing the degree of compression of the rubber or by employing rubber blocks of different sizes, thicknesses, or resiliency, practically all sizes, weights and types of vibrating bodies may be flexibly supported on the shock and vibration absorbing supports of this invention.

For a more complete understanding of the invention, reference may be had to the accompanying drawing, in which Figure 1 is an elevation of the new flexible support of this invention, as applied to a marine engine;

Figures 2 and 3 are respective plan and end views of the same;

Figure 4 is an enlarged side view of one flexible element of the support; and

Figure 5 is an enlarged plan view of the same.

In the drawing, numeral 10 designates a marine engine of the internal combustion type, although it may be any other form of engine, depending upon its use. Thus, an automobile engine, an aeroplane engine, an electric motor or any other vibrating body whose vibrations are sought to be absorbed before they are transmitted to the supporting member may be supported in substantially the same way. The marine engine mounting disclosed herein is accordingly employed merely for the purpose of illustrating the invention.

Supporting the engine 10 at each side are two lateral rails or beams 11, extending substantially parallel to the crank shaft or longitudinal axis of the engine 10 and having flat vertical surfaces of substantial area. The ends of the rails or beams 11 extend up close to the surfaces of two cross members 12, one of which may be the main cross member of the hull of the vessel on which the engine 10 is mounted, depending upon the location of the engine and the construction of the vessel.

Secured to the inner vertical wall of each cross member 12 by means of bolts 13, or the like, are two pairs of angle-iron brackets 14, the large vertical surfaces of the legs 15 of each pair lying on either side of the corresponding end of each of the rails or beams 11, as is shown particularly in Figures 2 and 5. As is illustrated in Figures 3 and 5, the openings 16 in the angle-iron brackets 14, through which the bolts 13 pass, are elongated laterally so that the angle-iron brackets 14 may be adjusted laterally along the corresponding cross members 12 to vary the spacing between the vertical surfaces of the legs 15 and the corresponding vertical surfaces of the rails 11.

The legs 15 of each pair of angle-iron brackets 14 are connected together by four spaced bolts 17, the outer two of which also pass through enlarged holes 18 in the corresponding rail 11, as is illustrated particularly in Figures 4 and 5, thus allowing the rail 11 to move a limited amount in all directions in a vertical plane.

Interposed between each lateral vertical surface of each rail and the corresponding adjacent inner vertical surface of the leg 15 of the angle-iron bracket 14 is a rubber block or pad 19 having flat surfaces corresponding substantially to the areas of the legs 15 opposite the corresponding end of the rail 11. The degree of compression, and consequently the degree of friction, between the surfaces of the rubber pads or blocks 19 and the engaging vertical surfaces of rails 11 and bracket legs 15 is adjustable by tightening or loosening bolts 17. The degree of adjustment of bolts 17 to secure the necessary compression of the rubber pads or blocks 19 is determined by the load which the pads or blocks 19 support and the amplitude of vibration of the engine 10, or the like, the friction between the rubber and the surfaces engaging it being sufficient to sustain the load.

The rubber pads or blocks 19 are accordingly unsecured either to the rails 11 or the angle-iron brackets 14, except by the friction between the relatively large engaging vertical surfaces, no bonding, rivets, bolts, or other direct or positive fastening arrangements between the rubber and the supporting and supported members being necessary. This arrangement enables quick replacement of the rubber pads or blocks 19 as they become deteriorated for any reason, and also enables an adjustment for loads of various kinds by substitution of the pads or blocks 19 with pads or blocks of different sizes and degrees of resiliency, the pads or blocks being selected in accordance with the requirements of use as to resiliency, hardness, and the like.

In use, the new flexible support of this invention is employed in any number, depending upon requirements, such as four for the arrangement illustrated in Figures 1, 2 and 3, and the rubber pads or blocks 19 are also selected according to requirements. The degree of compression of rubber pads or blocks 19 is adjusted by means of bolts 17, this adjustment being allowed by the slotted holes 16 in the angle-iron brackets 14, through which the supporting bolts 13 pass. It will be seen that the rubber pads or blocks 19 support the load directly in shear, since they are interposed between vertical surfaces which lie parallel to the plane of the application of the load, in this instance the engine 10, the rubber being otherwise unconfined and unsupported and accordingly free to "flow" under load. This flexing of rubber pads or blocks 19 in shear is permitted to a sufficient degree by the enlarged openings 18 in the rails 11, through which two of the bolts 17 pass, these bolts also supporting the engine in case the rubber fails for any reason.

The rubber pads or blocks 19 also permit movemen in a horizontal direction, such as, for example, to take up propeller thrust and the like, and also in a twisting or lateral direction to take up torque strains and the like. Thus, the new support permits and provides for movements between the supported and supporting members in all directions in a vertical plane and slight lateral movements as well. Not only does the flexible support of this invention prevent vibrations of the engine or other vibrating body from being transmitted to the supporting member, such as the hull, chassis, or fuselage or the like, but also suppresses transmission of periodic vibrations of the supporting member to the engine to prevent disturbing vibrations at the critical speeds of the engine or the like.

It has been found that in extremely cold weather, when the rubber is likely to become frozen and its resiliency, friction and thickness accordingly diminished, the engine is liable to slip slightly relatively to the supporting member, due to its weight, so that it is advisable to corrugate or otherwise roughen in a horizontal direction the vertical surfaces of 15 and 11 which engage the rubber or the surfaces of the rubber, or both, to increase the friction thereof under the aforementioned abnormal conditions. These roughenings are, however, relatively small and do not in any way affect the operation of the device of this invention but only serve the special purpose mentioned, being unnecessary under normal operating conditions.

While a preferred embodiment of the invention has been illustrated and described herein, it is to be understood that the invention is not limited thereby, but is susceptible of various changes in form and detail within its scope.

I claim:

1. In a flexible engine support, the combination of a supporting member, a pair of spaced angle-iron brackets each having one leg secured to said member and the other leg extending outwardly from the member at substantially a right angle thereto and in opposed parallel relation to the corresponding leg of the other bracket, said brackets being adjustable bodily along the member with respect to each other, a supported member including the engine having opposite vertical surfaces substantially perpendicular to said supporting member and interposed between the outwardly extending legs of the brackets, and a pad of resilient material compressed between the inner surface of each bracket and the corresponding vertical surface of the supported member and frictionally engaging the said surfaces for sustaining the weight of the engine in shear.

2. In an engine having at least one rail secured thereto and a supporting member extending transversely of the rail, the combination of a flexible joint between the supporting member and one end of the rail comprising a pair of right angle brackets mounted on said member with their free legs extending outwardly parallel to the rail along opposite sides thereof and spaced from the rail, a block of resilient material interposed between each outwardly extending leg and the adjacent side of the rail, and adjustable means connecting the two outwardly extending legs of the brackets for holding the legs together to compress both of the blocks between the rail and the legs equal amounts.

3. In an engine having at least one rail secured thereto and a supporting member extending transversely of the rail, the combination of a flexible joint between the supporting member and one end of the rail comprising a pair of right angle brackets mounted on said member with their free legs extending outwardly parallel to the rail along opposite sides thereof and spaced from the rail, a block of resilient material interposed between each outwardly extending leg and the adjacent side of the rail, said blocks having flat lateral surfaces engaging the legs and rail and being confined only at said surfaces, and adjustable means connecting the two outwardly extending legs of the brackets for holdng the legs together to compress both of the blocks between the rail and the legs equal amounts.

4. In an engine having at least one rail secured thereto and a supporting member extending transversely of the rail, the combination of a flexible joint between the supporting member and one end of the rail comprising a pair of right angle brackets mounted on said member with their free legs extending outwardly parallel to the rail along opposite sides thereof and spaced from the rail, a block of resilient material interposed between each outwardly extending leg and the adjacent side of the rail, and adjustable means extending through the rail between the two outwardly extending legs for holding the legs together to compress the blocks and operable to vary the compression in both blocks equal amounts.

GLENVILLE S. TREMAINE.